(12) United States Patent
Yarus et al.

(10) Patent No.: US 8,805,654 B2
(45) Date of Patent: Aug. 12, 2014

(54) DISTRIBUTION OF PROPERTIES IN A 3D VOLUMETRIC MODEL USING A MAXIMUM CONTINUITY FIELD

(75) Inventors: Jeffrey Yarus, Houston, TX (US);
Maurice C. Gehin, Houston, TX (US);
Rae Mohan Srivastava, Toronto (CA);
Richard L. Chambers, Bixby, OK (US)

(73) Assignee: Landmark Graphics Corporation, Houston, TX (US)

( * ) Notice: Subject to any disclaimer, the term of this patent is extended or adjusted under 35 U.S.C. 154(b) by 909 days.

(21) Appl. No.: 12/996,047

(22) PCT Filed: Jun. 9, 2008

(86) PCT No.: PCT/US2008/066333
§ 371 (c)(1),
(2), (4) Date: Dec. 3, 2010

(87) PCT Pub. No.: WO2009/151441
PCT Pub. Date: Dec. 17, 2009

(65) Prior Publication Data
US 2011/0131015 A1 Jun. 2, 2011

(51) Int. Cl.
*G06F 17/00* (2006.01)
*G01V 99/00* (2009.01)

(52) U.S. Cl.
CPC ............. *G06F 17/00* (2013.01); *G01V 99/005* (2013.01)
USPC .......................................................... 703/2

(58) Field of Classification Search
CPC .............................. G06F 17/00; G01V 99/005
USPC .......................................................... 703/2
See application file for complete search history.

(56) References Cited

U.S. PATENT DOCUMENTS

| | | | |
|---|---|---|---|
| 5,226,019 | A | 7/1993 | Bahorich |
| 5,838,634 | A | 11/1998 | Jones et al. |
| 5,884,229 | A | 3/1999 | Matteucci |
| 6,014,343 | A | 1/2000 | Graf et al. |
| 6,370,491 | B1 | 4/2002 | Malthe-Sorenssen et al. |
| 6,480,790 | B1 | 11/2002 | Calvert et al. |
| 6,826,520 | B1 | 11/2004 | Khan et al. |

(Continued)

OTHER PUBLICATIONS

Jeffrey M. Yarus et al., "Practical geostatistics—an armchair overview for petroleum reservoir engineers," 2006, Journal of Petroleum Technology, vol. 58, No. 11, pp. 78-87.*

(Continued)

*Primary Examiner* — Kamini S Shah
*Assistant Examiner* — Russ Guill
(74) *Attorney, Agent, or Firm* — Howard L. Speight (57) ABSTRACT

A model is created by distributing a plurality of points in the volume in the absence of a grid. Each point has a location. A first vector, having a length, a magnitude representing the value of the geological property in the neighborhood of the first point, and a direction representing the direction of maximum continuity, derived from a geological property in the neighborhood of the location of the first point, is assigned to a first point of the plurality of points. The direction of maximum continuity is the direction along which the magnitude of the geological property stays substantially the same for the greatest distance when moving away from the first point. The length of the first vector represents the distance from the first point in the direction of the first vector that the magnitude and direction of maximum continuity of the geological property stay substantially the same.

20 Claims, 7 Drawing Sheets

(56) References Cited

U.S. PATENT DOCUMENTS

| | | | |
|---|---|---|---|
| 6,988,038 | B2 | 1/2006 | Trappe et al. |
| 7,236,167 | B2 | 6/2007 | Lee et al. |
| 7,379,854 | B2 * | 5/2008 | Calvert et al. ............. 703/10 |
| 2002/0183932 | A1 | 12/2002 | West et al. |
| 2003/0055598 | A1 | 3/2003 | Gillard et al. |
| 2003/0115029 | A1 | 6/2003 | Calvert et al. |
| 2003/0182093 | A1 | 9/2003 | Jones et al. |
| 2004/0122634 | A1 | 6/2004 | Calvert et al. |
| 2004/0210394 | A1 | 10/2004 | Trappe et al. |
| 2005/0171700 | A1 | 8/2005 | Dean |
| 2007/0061117 | A1 | 3/2007 | Landis et al. |

OTHER PUBLICATIONS

Alison L. Love et al., "Visualizing Spatial Multivalue Data," 2005, IEEE Computer Graphics and Applications, May/Jun. 2005, pp. 69-79.*

Timothy Urness et al., "Strategies for the Visualization of Multiple 2D Vector Fields," 2006, IEEE Computer Graphics and Applications, Jul./Aug. 2006, pp. 74-82.*

Thomas A. Jones, "Using flowpaths and vector fields in object-based modeling," 2001, Computers & Geosciences, vol. 27, pp. 133-138.*

Xiaohuan Liu et al., "Geological Characterization of Naturally Fractured Reservoirs Using Multiple Point Geostatistics," paper SPE 75246, 2002, Society of Petroleum Engineers, pp. 1-12.*

International Preliminary Report on Patentability, PCT/US08/66333, which is the parent of the instant application; Oct. 25, 2011 (finding all claims patentable).

International Search Report, PCT/US08/66333, which is the PCT parent of the instant application; Oct. 30, 2008.

IP Australia Examiner's first report on patent application No. 2008357712, which claims priority from PCT/US2008/066333, which is the PCT parent of the instant application; Nov. 7, 2011.

Written Opinion of the International Searching Authority, PCT/US08/66333, which is the PCT parent of the instant application; Oct. 30, 2008.

Official Action of the Eurasian Patent Organization on Application No. 201071416, which is the EA application that corresponds to the instant application, dated Jan. 26, 2012.

Translation of the Jan. 26, 2012 Official Action of the Eurasian Patent Organization.

Canadian Intellectual Property Office, Examination report regarding Canadian Application No. 2,724,589, which is the corresponding Canadian application to the instant application.

IP Australia; Notice of Acceptance of patent application No. 2008357712, which claims priority from PCT/US2008/066333, which is the PCT parent of the instant application; Aug. 24, 2012.

The State Intellectual Property Office of the People's Republic of China, Notice on the First Office Action (PCT Application in the National Phase) of Application No. 200880129790.6, which claims priority from PCT/US2008/066333, which is the PCT parent of the instant application; Aug. 15, 2012.

Translation of Notice on the First Office Action (PCT Application in the National Phase) of Application No. 200880129790.6, which claims priority from PCT/US2008/066333, which is the PCT parent of the instant application; The State Intellectual Property Office of the People's Republic of China, Aug. 15, 2012.

Official Action of the Eurasian Patent Organization on Application No. 201071416, which is the EA application that corresponds to the instant application, dated Oct. 29, 2012.

Translation of the Jan. 26, 2012 Official Action of the Eurasian Patent Organization in Application No. 201071416.

Mexican Institute of Industrial Property, Communication of results of substantive examination, File No. MX/A/2010/03221, which is the Mexican patent application that corresponds to the instant application, dated Jun. 14, 2013.

Translation of Jun. 14, 2013 communication of results of substantive examination, File No. MX/A/2010/03221, which is the Mexican patent application that corresponds to the instant application.

Canadian Intellectual Property Office, Canadian Patent 2,724,589, which issued from the corresponding CA patent application to the instant application, Dec. 10, 2013.

The State Intellectual Property Office of the People's Republic of China, Notice on the Third Office Action in Application/Patent No. 200880129790.6 (which is the corresponding CN application to the instant application), Oct. 17, 2013.

Translation of the Notice on the Third Office Action in CN Application/Patent No. 200880129790.6 (which is the corresponding CN application to the instant application), Oct. 17, 2013.

* cited by examiner

DISTRIBUTION OF PROPERTIES IN A 3D VOLUMETRIC MODEL USING A MAXIMUM CONTINUITY FIELD

BACKGROUND

Geological models are often used to represent subsurface volumes of the earth. In many existing geological modeling system, the subsurface volume is divided into a grid consisting of cells or blocks and geological properties are defined or predicted for the cells or blocks.

DETAILED DESCRIPTION

Figure 1:
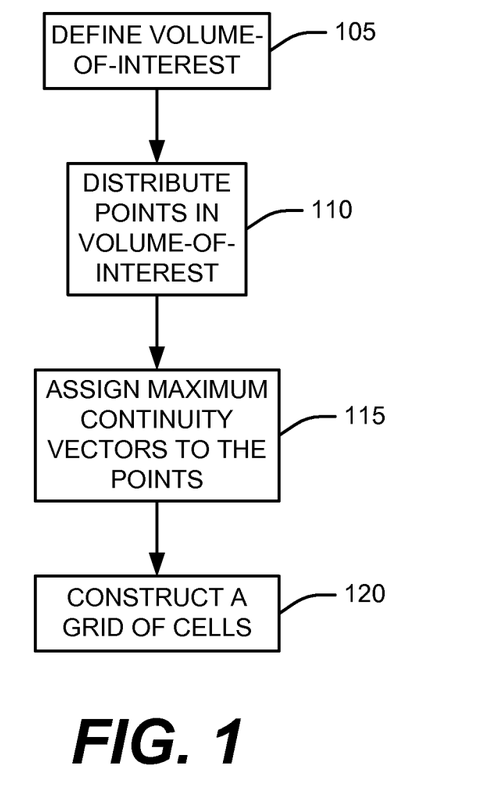
FIG. 1 is a flow chart illustrating one embodiment of part of the process of building a geological model.

In one embodiment of the technique described herein, illustrated in FIG. 1, a volume-of-interest is defined in the model (block 105). Points are distributed in the volume-of-interest (block 110). Vectors representing maximum continuity of a property are assigned to the points (block 115). A grid is then constructed within the volume-of-interest (block 120). Assigning the grid to the volume-of-interest is not performed at the beginning of the process. Instead, that process is deferred until after information about the geology of the volume-of-interest has been inserted into the model.

Figure 2:
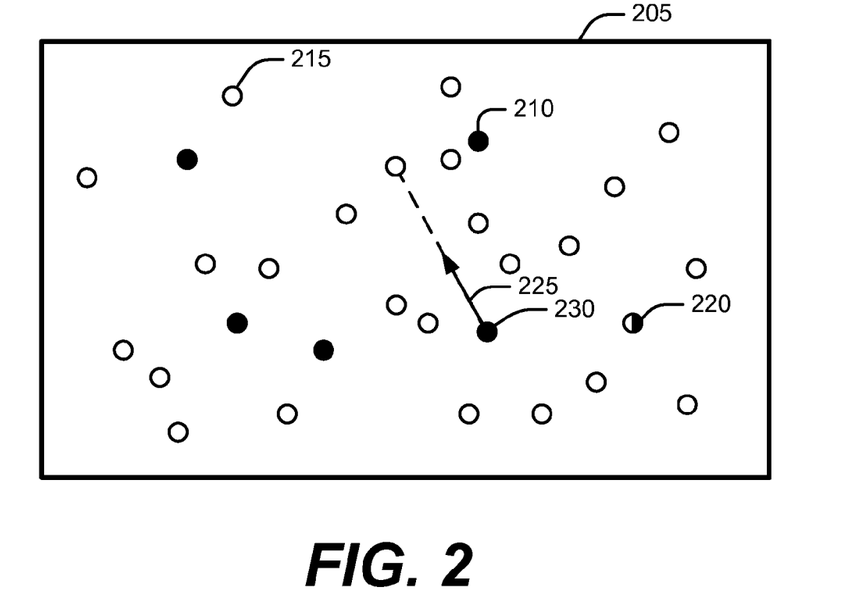
FIGS. 2-4 illustrate embodiments of distributing points in a volume-of-interest.

An example of a volume-of-interest 205, referred to in block 105 and illustrated in FIG. 2, is two dimensional ("2D"). In one embodiment, the volume-of-interest 205 is three dimensional ("3D"). In one embodiment, the volume-of-interest 205 is N-dimensional ("ND").

In one embodiment of distributing points in the volume-of-interest (block 110), some of the points, e.g. 210, represented by solid circles, represent locations in space where at least some information about a geological property is known. The known information may be acquired through seismic exploration, logging, or other techniques by which geological information is acquired. For example, in one embodiment such points would equate to either locations where wells have been drilled or a seismic shot point (location of a geophone) or a common depth point (the halfway point when a wave travels from a source to a reflector to a receiver, including corrections like dip moveout processing in the case where beds are not flat) or any point with a geographic location where a quantitative or qualitative measurement has been made. In one embodiment, other points, e.g. 215, represented by open circles, represent locations in space where information about a geological property has been estimated. The information is estimated using conventional geological and/or geostatistical techniques and interpolation and/or interpretation methods.

In one embodiment, a location may have an open circle for a first geological property and a solid circle for a second geological property, which indicates that the information about the first geological property is known but information about the second geological property has been estimated. In one embodiment, such a location, e.g. 220, is indicated by a circle that is partially filled.

Figure 4:
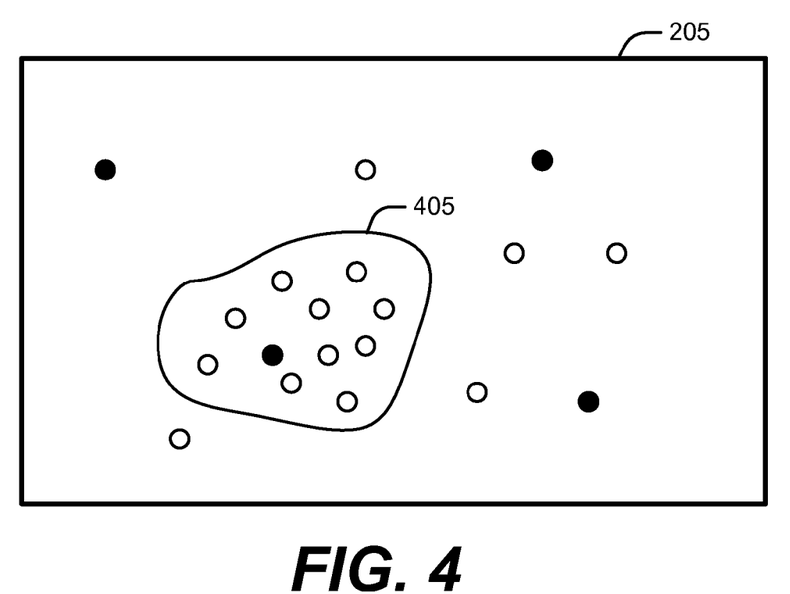

In one embodiment, the points are distributed randomly, as shown in FIG. 2. For example, in one embodiment, the coordinates of each point are generated by a random number generator. In one embodiment, the points are distributed evenly or regularly. For example, in one embodiment, the points are distributed in a regular square grid. In one embodiment, illustrated in FIG. 4, the points are distributed with greater concentration in an area-of-interest 405 within the volume-of-interest 205. For example, in one embodiment, the area-of-interest 405 is defined and points are randomly or evenly distributed within the area-of-interest 405. In one embodiment, points are distributed within the volume-of-interest 205, the area-of-interest 405 is defined, and new points are distributed within the area-of-interest 405 or points that had been defined outside the area-of-interest 405 are moved within the area-of-interest 405.

Figure 5:
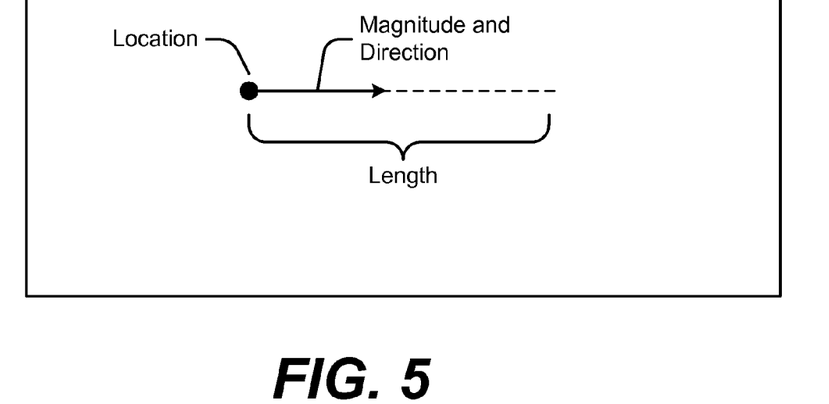
FIG. 5 illustrates a vector.

In one embodiment of assigning a vector representing maximum continuity of a property (block 115), as shown in FIG. 2, a vector 225 is assigned to point 230 at a location in space. The vector has a location, a magnitude, a direction, and a length. The location, magnitude and direction are represented as vectors are traditionally represented and as shown in FIG. 5. The vector has an additional dimension known as length, which is represented by a dashed line in FIG. 5. The dashed line is shown to be longer than the solid line representing the magnitude of the vector, but that is only for simplicity and ease of illustration. The actual value of length is not constrained in that manner.

The direction of maximum continuity can be defined from various inputs: specific layering style in an interval (vertical space bounded by 2 geological surfaces), projection from map view of channel limits, or free hand drawing by the geological user of the vectors in a specific portion of the volume-of-interest.

In one embodiment, the magnitude of the vector represents the value of the geological property in the neighborhood of the location of the point to which the vector is assigned. In one embodiment, the size of the neighborhood is variable and can depend on a number of factors, including the size of the volume-of-interest, the rapidity of change of the geological property throughout the volume or throughout a portion of the volume, and other factors.

In one embodiment, the direction of the vector represents the direction of maximum continuity, which is the direction in the volume-of-interest along which the magnitude of the geological property stays substantially the same for the greatest distance when moving away from the location of the vector. In one embodiment, "substantially the same" means within 10 percent. In one embodiment, "substantially the same" has a different meaning in different circumstances. For example, in some circumstances in which the geological property is highly variable over a large portion of the volume-of-interest, "substantially the same" may be higher, for example 15 percent. In other circumstances, in which the geological property is stable over a large portion of the volume-of-interest, "substantially the same" may be lower, for example 5 percent. In one embodiment, a user of the technique described herein adjusts a variable that determines the meaning of "substantially the same."

In one embodiment, the length of the vector represents the distance through the volume-of-interest from the location of the point to which the vector is assigned in the direction of the vector that the magnitude and direction of maximum continuity of the geological property stay substantially the same.

Figure 3:
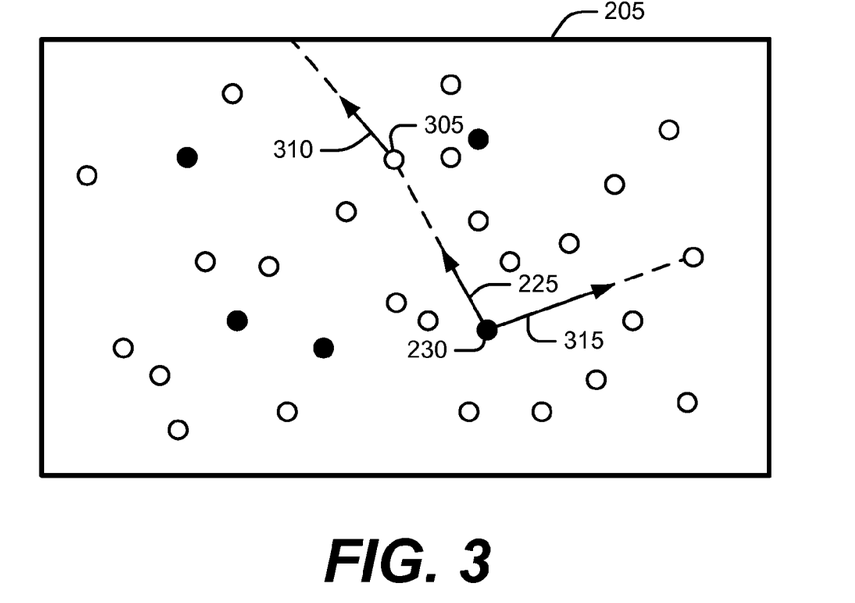

Examples of length are shown in FIGS. 2 and 3. Vector 225 has a magnitude and direction indicated by the length and direction of the solid arrow that originates at point 230 and is labeled 225. The length of the vector is indicated by the dashed line that extends from the tip of the vector 225 to point 305 where a new vector 310 has been defined. This indicates that maximum continuity has substantially the direction and magnitude of vector 225 from point 230 to point 305, where the direction and magnitude of maximum continuity changes to that of vector 310. The dashed line indicating the length of vector 310 extends to the edge of the volume-of-interest 205, and perhaps beyond.

In one embodiment, the dashed line indicating the length of a vector terminates either on the origin of another vector or at the edge of the volume. In one embodiment, the length of the vector is not constrained in that fashion and the dashed line indicating the length of a vector can end at an arbitrary point in the volume-of-interest, whether or not another vector originates at that point.

In one embodiment, as shown in FIG. 3, a point may be the origin of more than one vector. For example, in FIG. 3, point 230 serves as the origin of vector 225 and vector 315. In one embodiment, vector 225 represents one geological property and vector 315 represents another geological property.

Figure 6:
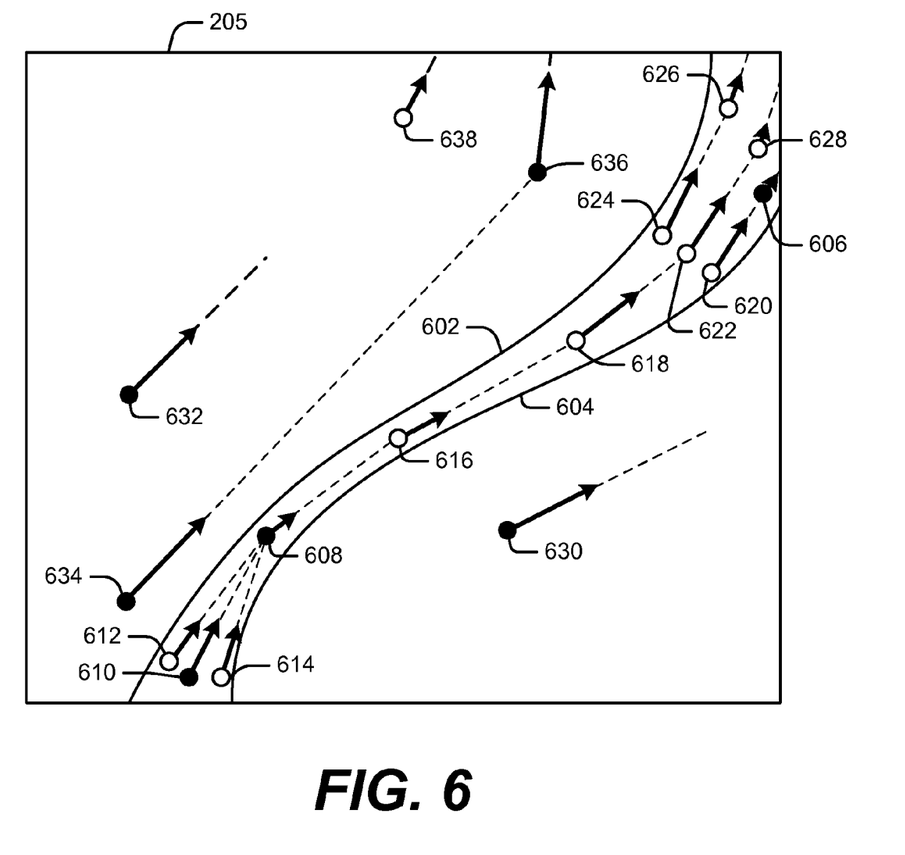
FIG. 6 illustrates an example of a distribution of points and assigned vectors.

FIG. 6 illustrates a model for which some of the foregoing analysis has been accomplished. As can be seen, a channel indicated by curved lines 602 and 604 has been hypothesized. Three points 606, 608, and 610 within the channel have been identified for which hard data is available. The model also includes points 612, 614, 616, 618, 620, 622, 624, 626, and 628 within the channel for which data has been estimated. Vectors have been assigned at all of the points within the channel. All of the vectors have lengths that extend to another point. In some cases, more than one vector terminates on a single point, e.g. 608, which indicates that the geological property being represented by the vectors shown in FIG. 6 is substantially the same in the area of points 608, 610, 612 and 614. Some of the vectors originate at points, e.g. 620 and 624, which are not terminations for other vectors. Some of the vectors have lengths that terminate at the edge of the volume-of-interest 205, such as the vectors that originate at points 606, 626, and 628.

The example model in FIG. 6 includes two points outside the channel for which hard data is available 630, 632 for which the dashed line indicating the length of the vector originating at that point does not terminate on another point. The example model in FIG. 6 includes two points outside the channel for which hard data is available 634, 636. The dashed line indicating the length of the vector 634 ends on point 636. The dashed line indicating the length of the vector originating at point 636 ends at the edge of the volume-of-interest 205.

The example model in FIG. 6 includes a point outside the channel for which data has been estimated 638. The length of the dashed line indicating the length of the vector originating at point 638 ends at the edge of the volume-of-interest 205.

Figure 7:
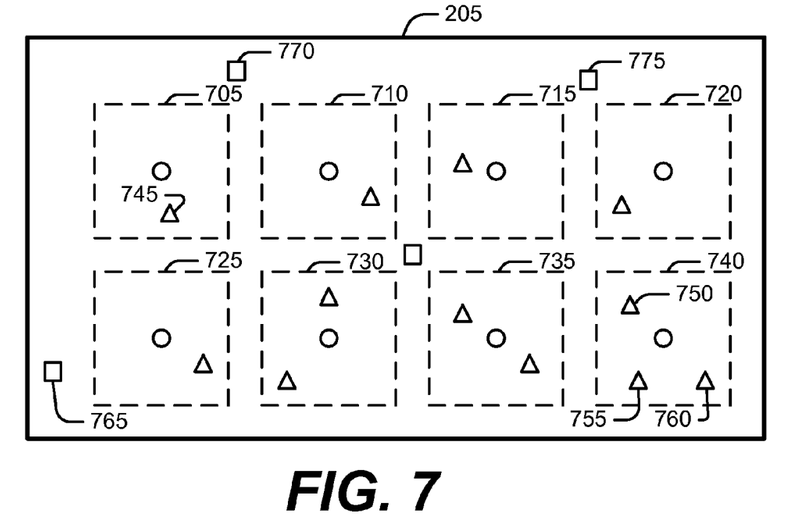
FIGS. 7-8 illustrate embodiments of gridding.
Figure 8:
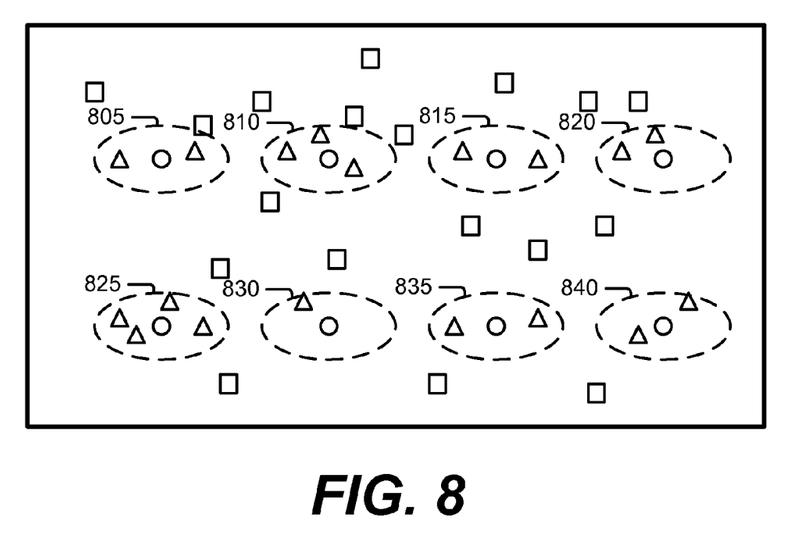

Returning to FIG. 1, in one embodiment, constructing a grid of cells (block 120) includes constructing a first grid of cells within the model. Each cell in the first grid of cells covers a portion of the volume-of-interest and has a value associated with it. The value is derived from the vectors that have origins within the portion of the volume-of-interest that is covered by the cell. The cells 705, 710, 715, 720, 725 730, 735, 740 shown in FIG. 7, are squares in a 2D volume-of-interest or cubes in a 3D volume-of-interest. The value associated with each cell is derived from the values of the vectors that originate anywhere within the cell, shown by open triangles. For simplicity, only the origins of the vectors are shown in FIGS. 7 and 8. For example, the value associated with cell 705 is derived from the value of vector 745 and the value associated with cell 740 is derived from the values of vectors 750, 755, and 760. Vectors outside the cells, shown as open squares such as vectors 765, 770, and 775, are not included in the derivation of cell values.

In one embodiment, the value associated with a cell include a location, represented by the open circles at the center of each cell, and a direction, magnitude, and length.

In one embodiment, each cell has a shape. If the volume-of-interest is three dimensional, the cells can be cubes, regular volumetric polygons, irregular volumetric polygons, ellipsoids, irregular curved volumes, pebi grids or any other three dimensional shape. If the volume-of-interest is two dimensional, the cells can be squares, regular polygons, irregular polygons, ellipses, irregular curved areas or any other two dimensional shape. For example, in FIG. 8, the cells 805, 810, 815, 820, 825, 830, 835, 840 are ellipses in two dimensions and ellipsoids in three dimensions.

In one embodiment, if the cell is not a three dimensional sphere or a two dimensional surface, it has an axis that is aligned with the direction of maximum continuity. For example, if a cell is a non-circular ellipse, the major axis of the cell would be aligned with the direction of maximum continuity.

In one embodiment, other grids of cells can be constructed that cover the same volume-of-interest. The cells in the new grids can have the same shapes and sizes or they can have different shapes and sizes. Further, the boundaries of the cells in the new grids need not coincide with the boundaries of the cells in the first grid.

Figure 9:
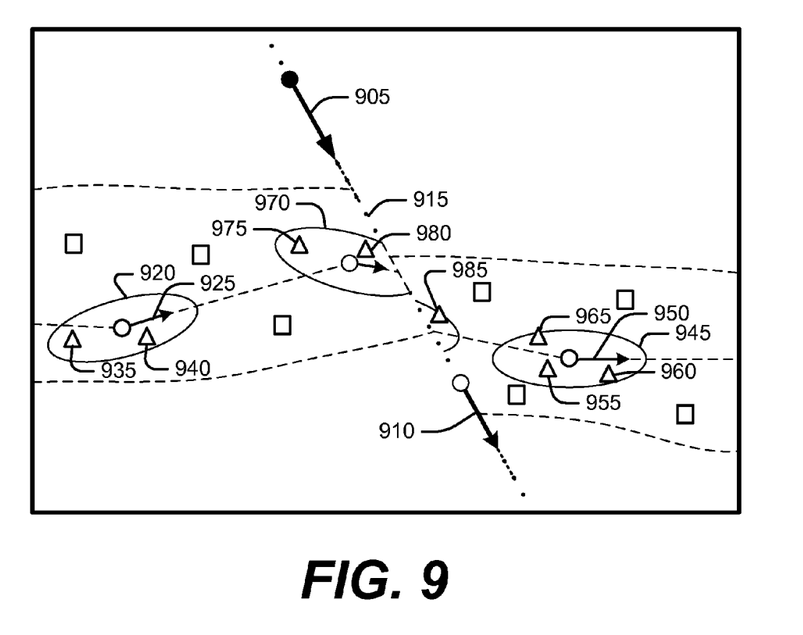
FIG. 9 illustrates an embodiment including a fault.

In one embodiment, as shown in FIG. 9, in addition to the field of vectors of maximum continuity, another series of vectors 905, 910 is also defined that specify the fault throw in the neighborhood of a fault, represented by dotted line 915, defined inside the volume-of-interest. In one embodiment, the fault-throw vectors 905, 910 are defined automatically without user intervention from the input structural framework. In one embodiment, the fault-throw vectors 905, 910 define the displacement to apply to 2 pieces of rock on either side of the fault so that they are back next to each other as they were before the faulting occurred. In one embodiment, the fault-throw vectors 905, 910 have locations, represented by the open circles at one end of the vectors, directions and magnitudes, represented by the length and direction of the arrows associated with each vector, and lengths, represented by the length of the dashed line that extends, in the examples shown in FIG. 9, beyond the end of the vectors. In one embodiment, the direction and magnitude of the fault-throw vectors represent the direction and magnitude of the fault displacement. In one embodiment, the length of a fault-throw vector represents the distance from the location of the fault-throw vector that the direction and magnitude of the fault displacement is substantially the same. As before, the meaning of the term "substantially the same" depends on the circumstances. In one embodiment, "substantially the same" means within 10 percent.

FIG. 9 also illustrates values of cells that have been derived from vectors that fall within the cells. Cell 920 has a value represented by vector 925 that was derived from the values of vectors 935 and 940 (for simplicity only the origins of vectors 935 and 940 are shown). Similarly, cell 945 has a value represented by vector 950 that was derived from the values of vectors 955, 960, and 965 (for simplicity only the origins of vectors 955, 960, and 965 are shown). Note that the major axes of cells 920 and 945 are aligned with their directions of maximum continuity.

In one embodiment, the maximum continuity vectors are used to define the search neighborhood around each location where a property value needs to be estimated. In one embodiment, the search neighborhood is defined by a search ellipsoid. The search ellipsoid main axis is aligned with the maximum continuity vector. The volume surrounding the location to estimate is then scanned, from the center of the ellipsoid toward the periphery, until a minimum amount of known data has been found. At that point, in one embodiment, a cell is defined that is equivalent to the final search neighborhood. Each known data value as well as its relative location inside the ellipsoid in then forwarded to standard geostatistical algorithms to estimate the value to be associated with the cell.

In one embodiment, if one or more faults intersect the search neighborhood, the fault throw vectors are then used to displace part of the search neighborhood so that it cancels out the fault displacement. For example, in FIG. 9, a search neighborhood ellipsoid 970 is intersected by fault 915. Fault throw vector 905 is used to displace the search neighborhood ellipsoid so that it encompasses not only vectors 975 and 980 but also vector 985, which would not have been encompassed had the displacement not been respected.

Figure 10:
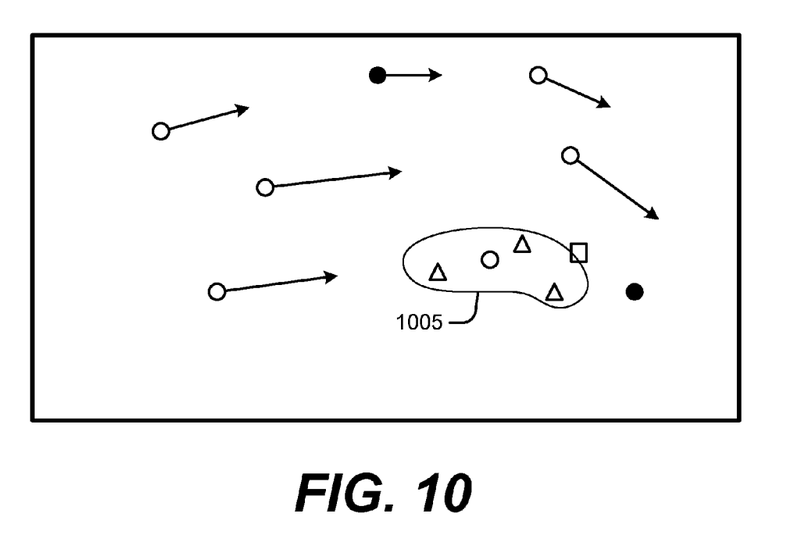
FIG. 10 illustrates an embodiment of a deformed cell.

In another embodiment, the search neighborhood ellipsoid 1005 is deformed shape such as a deformed ellipsoid, as shown in FIG. 10. This would allow a search neighborhood ellipsoid to follow the contours of maximum continuity, as shown by the vectors in FIG. 10.

Figure 11:
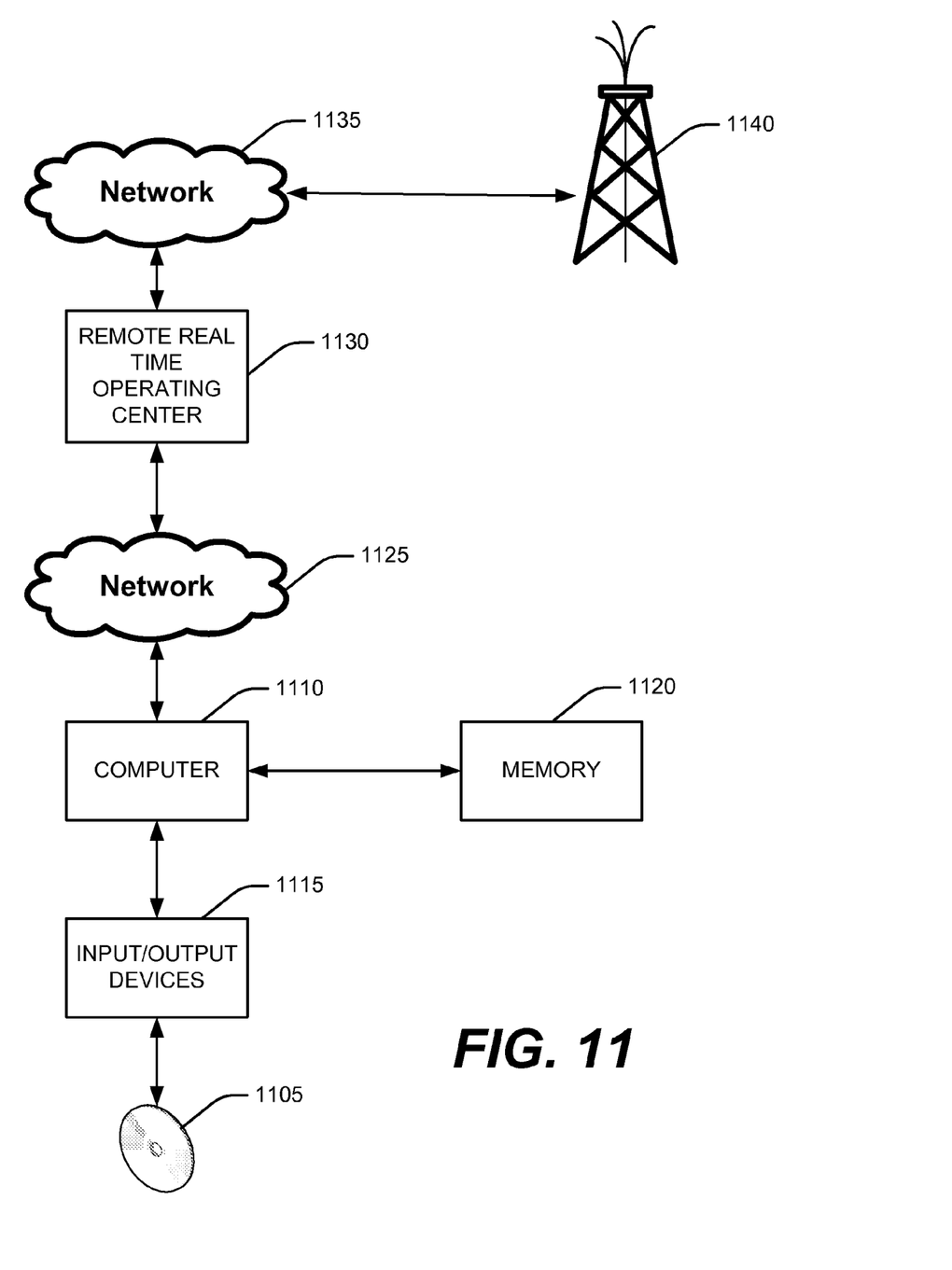
FIG. 11 illustrates an embodiment of an environment.

In one embodiment, the modeling system is stored in the form of a computer program on a computer readable media 1105, such as a CD or DVD, as shown in FIG. 11. In one embodiment a computer 1110 reads the computer program from the computer readable media 1105 through an input/output device 1115 and stores it in a memory 1120 where it is prepared for execution through compiling and linking, if necessary, and then executed. In one embodiment, the system accepts inputs through an input/output device 1115, such as a keyboard, and provides outputs through an input/output device 1115, such as a monitor or printer. In one embodiment, the system creates an earth model in memory 1120 or modifies an earth model that already exists in memory 1120.

In one embodiment, the earth model that resides in memory 1120 is made available through a network 1125 to a remote real time operating center 1130. In one embodiment, the remote real time operating center makes the earth model, or data from the earth model, available through a network 1135 to help in the planning of oil wells 1140 or in the drilling of oil wells 1140.

The text above describes one or more specific embodiments of a broader invention. The invention also is carried out in a variety of alternate embodiments and thus is not limited to those described here. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A method for creating a model of the geological properties in a volume of the earth using a computer, the method comprising:
   distributing a plurality of points in the volume in the absence of a grid, each point having a location;
   the computer assigning a first vector to a first point of the plurality of points, the first vector having a length, a magnitude, and a direction derived from a geological property in the neighborhood of the location of the first point;
   the magnitude of the first vector representing the value of the geological property in the neighborhood of the first point;
   the direction of the first vector representing the direction of maximum continuity, the direction of maximum continuity being the direction in the volume along which the magnitude of the geological property stays substantially the same for the greatest distance when moving away from the first point; and
   the length of the first vector representing the distance through the volume from the first point in the direction of the first vector that the magnitude and direction of maximum continuity of the geological property stay substantially the same.

2. The method of claim 1 further comprising:
   assigning a second vector to a second point of the plurality of points, the second vector having a length, a magnitude and a direction derived from the geological property at the location of the second point;
   the length, magnitude, and direction of the first vector being independent of the length, magnitude, and direction of the vector at the second point.

3. The method of claim 1 wherein distributing a plurality of points in the volume in the absence of a grid comprises distributing the points with a greater concentration in an area of interest.

4. The method of claim 1 wherein distributing a plurality of points in the volume in the absence of a grid comprises distributing the points randomly.

5. The method of claim 1 wherein distributing a plurality of points in the volume in the absence of a grid comprises distributing the points evenly.

6. The method of claim 1 further comprising assigning a third vector to the first point, the third vector having a length, a magnitude, and a direction derived from a second geological property in the neighborhood of the location of the first point.

7. The method of claim 1 further comprising distributing a second plurality of points in the volume in the absence of a grid.

8. The method of claim 1 further comprising assigning vectors to all of the plurality of points.

9. The method of claim 1 further comprising constructing a first grid of cells, each cell covering a portion of the volume, each cell having associated with it a value that is derived from the vectors assigned to the points within the portion of the volume covered by the cell.

10. A method for modeling the geological properties in a volume of the earth using a computer, the method comprising:
    distributing points in the volume in the absence of a grid, each point having a location;
    the computer assigning vectors to the points, each vector having a length, a magnitude, and a direction derived from a geological property at the location of the point to which it is assigned;
    the magnitude of each vector representing the value of the geological property at the location of the point to which the vector is assigned
    the direction of the vector representing the direction of maximum continuity, the direction of maximum continuity being the direction in the volume along which the magnitude of the geological property stays substantially the same for the greatest distance when moving away from the location of the point to which the vector is assigned;

the length of the vector representing the distance through the volume from the location of the point to which the vector is assigned in the direction of the vector that the magnitude and direction of maximum continuity of the geological property stay substantially the same; and constructing a first grid of cells, each cell covering a portion of the volume, each cell having associated with it a value that is derived from the vectors assigned to the points within the portion of the volume covered by the cell.

11. The method of claim 10 wherein each cell has a shape and the shapes of at least some of the cells are selected from the group of shapes consisting of cubes, regular volumetric polygons, irregular volumetric polygons, ellipsoids, irregular curved volumes, and pebi grids.

12. The method of claim 10 further comprising constructing a second grid different from the first grid.

13. The method of claim 10 wherein the first grid is N-dimensional and N>2.

14. A method for modeling the geological properties in a volume of the earth using a computer, the volume including a fault, the method comprising:

the computer defining a fault vector in the volume at a fault point adjacent to a location of the fault, the fault vector having a length, a direction and a magnitude representing the displacement of the volume at the fault point caused by the fault;

the magnitude of the fault vector representing the amount of displacement of the volume at the fault point;

the direction of the fault vector representing the direction of displacement of the volume at the fault point;

the length of the fault vector representing the distance in the direction of the fault vector that the direction and magnitude of displacement is substantially the same; and constructing a neighborhood region across the fault, the neighborhood region having two parts bounded by the fault, the first part being displaced from the second part in the direction of and by the magnitude of the fault vector.

15. The method of claim 14 further comprising:

distributing points in the volume in the absence of a grid, each point having a location;

assigning vectors to the points, each vector having a length, a magnitude, and a direction derived from a geological property at the location of the point to which it is assigned;

the magnitude of each vector representing the value of the geological property at the location of the point to which the vector is assigned the direction of the vector representing the direction of maximum continuity, the direction of maximum continuity being the direction in the volume along which the magnitude of the geological property stays substantially the same for the greatest distance when moving away from the location of the point to which the vector is assigned;

the length of the vector representing the distance through the volume from the location of the point to which the vector is assigned in the direction of the vector that the magnitude and direction of maximum continuity of the geological property stays substantially the same;

associating a value with the neighborhood region, the value being derived from the geological property vectors having locations in the first part or the second part.

16. The method of claim 14 wherein the neighborhood region has a shape, the shape being selected from the group of shapes consisting of an ellipsoid and a deformed ellipsoid.

17. A non-transitory computer-readable medium on which is recorded a computer program for creating a model of the geological properties in a volume of the earth, the program comprising executable instructions, that, when executed, perform a method comprising:

distributing a plurality of points in the volume in the absence of a grid, each point having a location;

assigning a first vector to a first point of the plurality of points, the first vector having a length, a magnitude, and a direction derived from a geological property in the neighborhood of the location of the first point;

the magnitude of the first vector representing the value of the geological property in the neighborhood of the first point;

the direction of the first vector representing the direction of maximum continuity, the direction of maximum continuity being the direction in the volume along which the magnitude of the geological property stays substantially the same for the greatest distance when moving away from the first point; and the length of the first vector representing the distance through the volume from the first point in the direction of the first vector that the magnitude and direction of maximum continuity of the geological property stay substantially the same.

18. The non-transitory computer-readable medium of claim 17, wherein the method further comprises:

assigning a second vector to a second point of the plurality of points, the second vector having a length, a magnitude and a direction derived from the geological property at the location of the second point;

the length, magnitude, and direction of the first vector being independent of the length, magnitude, and direction of the vector at the second point.

19. The non-transitory computer-readable medium of claim 17, wherein the method further comprises assigning vectors to all of the plurality of points.

20. The non-transitory computer-readable medium of claim 17, wherein the method further comprises constructing a first grid of cells, each cell covering a portion of the volume, each cell having associated with it a value that is derived from the vectors assigned to the points within the portion of the volume covered by the cell.

* * * * *